Jan. 26, 1932.  C. H. COLVIN ET AL  1,842,824
TURN INDICATOR
Filed Nov. 13, 1923  2 Sheets-Sheet 1

Inventors
Charles H. Colvin
Morris M. Titterington
By Attorneys

Jan. 26, 1932.  C. H. COLVIN ET AL  1,842,824
TURN INDICATOR
Filed Nov. 13, 1923  2 Sheets-Sheet 2
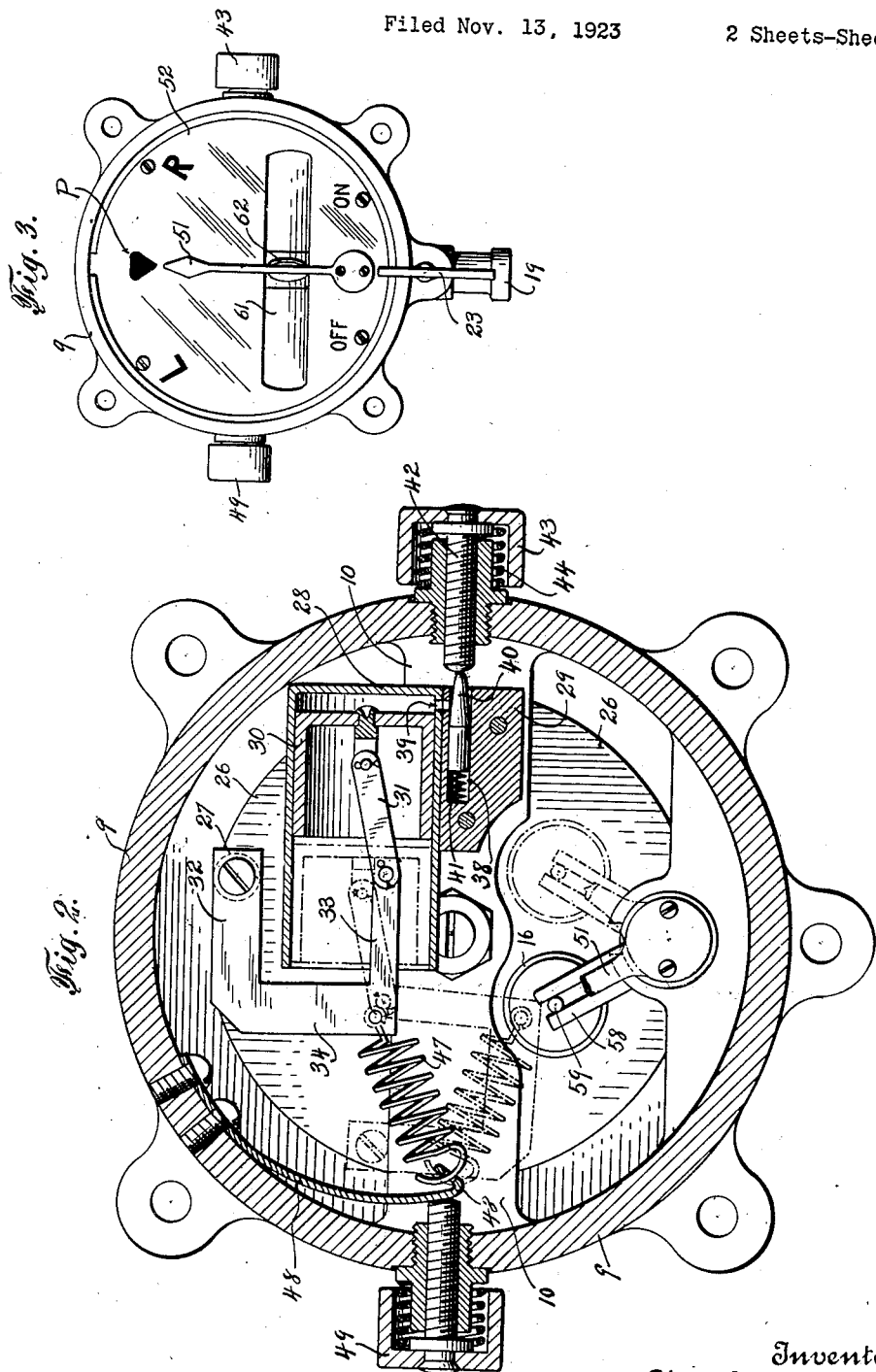
Inventors
Charles H. Colvin
Morris M. Titterington
By Attorneys

Patented Jan. 26, 1932

1,842,824

UNITED STATES PATENT OFFICE

CHARLES H. COLVIN AND MORRIS M. TITTERINGTON, OF BROOKLYN, NEW YORK; GEORGE A. TITTERINGTON, EXECUTOR OF SAID MORRIS M. TITTERINGTON, DECEASED, ASSIGNOR TO PIONEER INSTRUMENT COMPANY, INCORPORATED, OF BROOKLYN, NEW YORK, A CORPORATION OF NEW YORK

TURN INDICATOR

Application filed November 13, 1923. Serial No. 674,489.

This invention relates to navigation instruments and particularly to instruments for indicating angular motion, or to turn indicators; and this application sets forth improvements over the Charles H. Colvin prior turn indicator applications filed July 5, 1919, now Patent 1,610,930 and Patent 1,660,152 filed April 1, 1922.

A main object of the invention is to produce a navigating instrument for controlling the flight of air craft under conditions of poor visibility and particularly for indicating to the pilot any deviation from a straight line, that is to say, to indicate turning, in order that the ship, aircraft, or other vehicle may be more safely and accurately navigated, and particularly so by night or through fogs by providing the pilot with a simple instrument which he may observe and seldom be put to the necessity of observing land marks; and likewise it is an object to produce a navigation instrument capable of being adapted for use to indicate pitching or rolling of the craft.

An additional object and feature of the invention is to produce an instrument for the purpose described having improved damping mechanism acting to steady the instrument's indicating means thereby eliminating vibration, as well as excess movement and erratic action of the indicating mechanism thereby insuring reliable performance.

The accompanying drawings illustrate a preferred form of the invention and it is appreciated that the construction and mode of operation thereof may be suitably varied in certain respects without departing from the scope and principle of our invention.

Figure 2 shows a sectional view as taken on the line 2—2 of Figure 1.

Figure 3 shows a face view of the instrument illustrating the dial thereof and indicating means.

Figure 1:
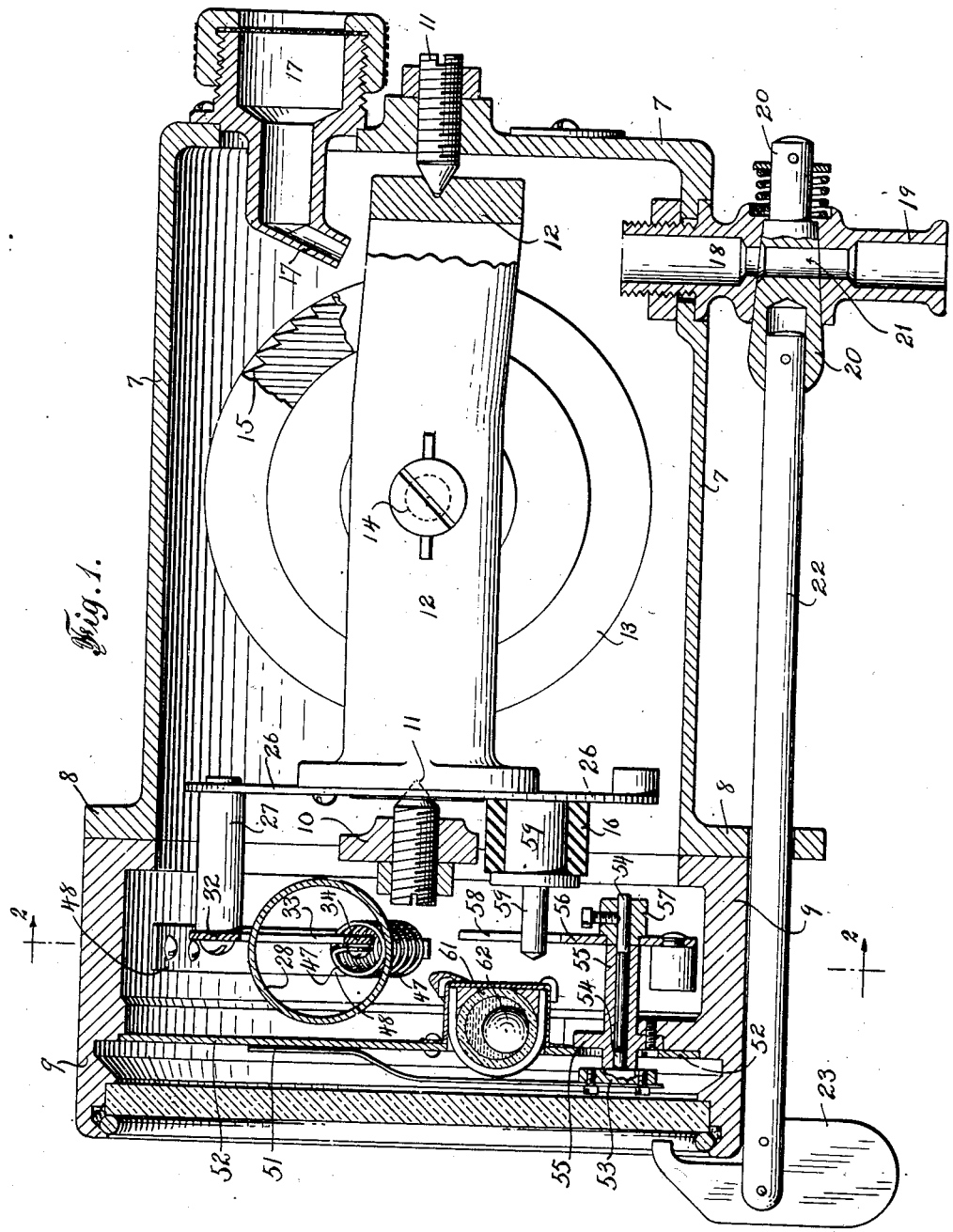
Figure 1 shows a longitudinal central section through the turn indicator.

Referring now more particularly to the drawings for a detailed description of the turn indicator invention, there is shown a turn indicator housing 7 substantially closed on the back end thereof and having a flange 8 on the open end thereof carrying a housing end piece 9, and a bridge 10 which reaches across the housing as a support for one end of a gyroscopic element; and the bridge may be an integral part of the housing end 9 or otherwise fitted into the housing depending on the convenience of the manufacturer. The flange 8 may be utilized as an instrument board installation means for fixing the instrument in position on a vehicle or ears may be employed as shown in the front views. Bearing screws in the nature of pivot pins 11 are carried by the housing and bridge, and pivotally support a gyroscope wheel or rotor frame 12. A gyroscopic rotor 13 is carried on an axle or bearing 14 in the frame 12, and this gyroscopic element 12—13 is thereby pivotally carried on the longitudinal axis of the housing while the rotor axle 14 is carried in the frame 12, which arrangement of parts permits the gyroscopic element to oscillate around the axis 11 due to precession thereof as caused by vertical axial turning movement of a vehicle upon which the instrument is mounted.

The gyroscope wheel is made with peripherial air pockets or notches 15 in line with an air jet driving means as will be described. The gyroscopic element is, in this instance, insensitive to rolling or pitching movements of the vehicle because when installed with its axis 11 lined up parallel with the vehicle's longitudinal axis, the gyro element is sensitive only to turning movements of the vehicle; that is to say, the gyroscope 12—13 precesses only when the vehicle moves about its vertical axis to change its direction in azimuth, and such movement is translated through improved transmitting mechanism to an indicating means visible to the pilot. A stop 16 is anchored to the gyroscope frame and comes to rest in a cushioning manner against the bridge 10 when the gyroscope precesses through its maximum distance.

The instrument illustrated is preferably air driven, and to this end the housing is made substantially air tight and carries an air nozzle or jet 17 the inner orifice of which is in alignment with the notched rotor and projects an air stream tangentially there-against to spin the gyroscopic rotor 13 to generate gyroscopic force. The instrument may be operated on positive or negative air pressure, and the housing is fitted with air evacuating means in the form of a valve housing 18 carrying a neck 19 adapted to connect with suitable air suction means as for example a flexible tubing running to a Venturi tube or suction pump to operate the gyroscope. The housing carries a valve core 20 made with a passage 21 openable and closable across the valve housing passage through the agency of a valve reach rod 22 provided with a finger and thumb piece 23 on the front end thereof and operable from the front of the instrument whereby the driver or pilot may close or partly close off the suction supply to stop, start, and regulate the speed of the gyroscopic rotor.

The foregoing is in general descriptive of the gyroscopic element and driving means therefor, and a description will now be given of the improvements in respect to the indicating, the damping, and the centralizing means.

A vertically disposed frame extension in the form of a frame plate or disc 26 is carried on one end of the gyroscope frame and rigidly carries a post 27 which reaches forwardly beyond the bridge 10, and this post oscillates or swings back and forth with the precessing gyroscopic element. A dashpot cylinder 28 is carried in fixed relation upon a valve block 29, the block being anchored to the bridge and having in this instance its axis horizontally disposed and in parallel relation to the frame plate 26. A piston 30 reciprocates in the cylinder under force of the precessing gyroscope, and the piston carries a connecting rod 31 which pivotally connects with a specially contrived lever arm of irregular shaped structure designed to operate in a rather limited space yet at the same time translate a substantially long sweep or oscillating movement of the gyroscope frame to the piston.

The lever arm is in this instance made substantially U-shaped or of arched design and comprises parallel legs or lever arms 32 and 33 joined at one end by an integral part 34 and may be stamped or cut from sheet stock, as many of the other parts are, which contributes generally to lightness in weight, thereby minimizing the inertia of moving parts. One end of the lever arm is rigidly anchored to the post 27 which adapts the special lever to the motion of the gyroscope frame disc 26, while the other end is pivoted to the connecting rod 31, and this structure and arrangement of parts permits the long lever arm or plate to sweep around the open cylinder end without interference, for when the gyroscope frame precesses clockwise as during a vehicle's or ship's left turn, the position of the parts is as shown in full lines, Figure 2, while for a right turn the gyroscope precesses counter-clockwise and moves the piston and lever arm to or toward the dotted line position. The leg 32 is disposed along the rim of the frame plate 26, and the other leg 33 hooks in and out the dashpot cylinder to reciprocate the piston; and the piston compresses air to damp and steady the gyroscope precession in one direction and works against a rarefied state of air on the reverse movement to similarly damp the gyroscopic precession and steady the motion of the instrument.

As a means of regulating the damping effort of the dashpot, the valve and cylinder supporting block 29 is made with a cylinder bore 38 communicating through a restricted and variable size air passage 39 to the dashpot cylinder; and a plunger having a tapered or cone-shaped end 40 is slidably confined in the bore 38 with a spring 41 acting to normally seat the plunger 40 against a regulating screw 42 having an outside manual control means such as a knurled finger and thumb piece in the form of a skirt 43 covering a spring 44, the said spring being employed to exert a locking tendency to prevent accidental turning of the screw 42. The plunger 40 working over the orifice 39 executes a gradual cut-off to regulate the flow of air in and out the dashpot cylinder to attain the maximum damping efficiency; and the proper setting of this dashpot regulating valve is effected by trial or experiment to suit the individual preference of a pilot or better adapt the instrument to a particular type craft. While it is true that the air within the instrument housing is in a rarefied state, still the pressure therein is positive enough to supply air under working pressure to the dashpot, for regardless of the atmospheric rarefaction in the housing, the air in the dashpot is always of greater pressure during the piston compression stroke and less during the suction stroke than that of the housing; and therefore the dashpot exercises a steadying influence over the gyroscopic element without in the least impairing the sensitive character of the instrument.

A continual centralizing effort necessarily must be exerted on the gyroscopic element to return it to zero or normal position immediately the angular motion of the aircraft or vehicle on which the instrument is installed has ceased. For this purpose a centralizing spring 47 is fastened at some convenient point to the gyroscopic element, as in this instance to the lever plate 33 and to a plate spring anchorage 48. An external manual adjustment screw 49 turns in or out the housing against the free end of the plate spring to vary the tension of the centralizing spring 47 which acts directly against the lever plate to hold the gyroscope in normally inactive centralized position so long as the instrument and vehicle are moving in a straight line. The function of the plate spring 48 is to follow in and out against the screw 49 to vary the strength of the centralizing spring 47 and leaving said centralizing spring to exert all the centralizing effort.

An indicating means is operated by the gyroscopic element and is held under the combined damping and centralizing influence of the instrument to produce reliable and positive dial readings; and to this end a hand 51 sweeps across the upper indexed region of an instrument dial 52, and has its lower end anchored to a block or head 53 integral with a hand supporting and oscillating shaft 54 journaled in a bearing 55 which is suitably fixed to some stationary part as in this instance the end piece 9. A shaft operating member consisting of a vertical arm 56 anchored to a shouldered hub 57 is anchored to the inner end of the shaft 54 and carries an upwardly reaching fork or slotted end 58 which freely embraces a gyroscope frame pin 59, which pin is preferably anchored to the frame plate 26, and which pin may carry the bumper or stop 16. It is now observed how the hand is connected to the gyroscopic element to move from the central straight line reference point P across to the index L when the aircraft veers to the left, and similarly acts across toward the mark R when the vehicle turns to the right. A counterbalance weight may be attached to the lower end of the arm 56 to balance the hand 51.

An important feature of the damping mechanism resides in the improved cylinder and piston dashpot construction whereby friction is reduced to a minimum in the use of non-lubricated moving parts. We preferably make the cylinder of nickle and the piston of a phenolic resinous material, for during a long period of experimentation and endeavor to overcome the difficulties inherent in other combinations of materials we have discovered that a material of this kind and nickel maintain a constantly and uniformly low coefficient of friction and never require lubrication. These materials selected after long research also possess the advantage of enabling the manufacturer to make the delicate parts of more rugged construction, for it will be understood by those appreciating the technical problems involved that, if the parts are made heavy and rugged of other materials, the problem of inertia and sluggishness introduces itself thereby impairing the delicate sensitivity of the instrument. The use of nickel and a phenolic resinous material so readily removes the heretofore unavoidable difficulties that this instrument has been promptly adopted as standard equipment in many departments of aerial navigation.

Our improvements in these respects leave the gyroscope thoroughly sensitive, for it is to be understood that the damping load imposed by the dashpot does not assert itself at the inception of the precessional movement but builds up immediately after such movement starts, whereupon the gyroscope acquires a slight damping characteristic which quickly acts to stall, so to speak, or stop the gyroscopic precession simultaneously with the termination of the angular motion or vehicle turn which initiated the precession, though the strength or opposing efforts of the dashpot preferably is not so great as will in any way restrain the force of precession against permitting the gyroscope to reach its maximum precessed position as caused by the angular movement of the vehicle. In other words the dashpot does not act to prevent the gyroscopic indicator from reaching its full movement, but the gyroscope is restrained from overprecession and correspondingly the indicating means operated thereby is held against excess indicating travel; and therefore vibration or erratic oscillation is eliminated.

Another structural improvement over the art resides in our combined and improved gyroscope bridge housing support and movement transmitting means running from the precession element to the indicating means on the dial, as well as to the damping element on the bridge. It is observed how our gyroscopic element, and particularly the frame, reaches beyond the bridge support to connect with the dashpot above and similarly reaches forward to connect with the indicating hand below thereby simplifying the assembly of the parts for they may now be mounted forwardly of the bridge support within the housing end piece. Furthermore these two connections are made substantially in opposite relation on the frame disc thereby balancing the instrument and affording a symmetrical arrangement without introducing expensive gear or other transmission means. It is observed how the improved construction provides in effect two reach posts or pins 27 and 59 integral with the gyroscopic element and projecting beyond the bridge 10 to respectively connect with the dashpot and indicating means.

An equally important feature of this instrument resides in its characteristic and novel mode of operation whereby the hand does in fact swing toward the direction of turn and with the movement of the craft rather than opposite thereto as in other patented turn indicators. This result is accomplished through the agency of the connection of the lower end of the hand with the lower part of the gyroscope frame; and furthermore a longer and more readable hand movement is obtained by use of this improved construction. In other words quick readings are taken from our improved navigation instrument by reason of its long hand, and by avoiding a direct connection to the gyroscopic precession axis 11, we improve our instrument in the several respects named.

A banking element or indicator may be utilized to advantage in an instrument of this character to aid the pilot in judging the proper banking angle in executing a turn. The banking indicator comprises a transparent container such as glass tube 61, carrying a ball indicator 62 which rolls through liquid and comes to rest at the central reference marks on the tube when the airplane is on proper bank in a turn. The glass tube 61 is mounted in a slot formed in the dial plate 52 behind the hand 51 and is conveniently observed in connection with the indicator hand. The ball rolls out to the right away from the reference mark when making a left hand turn in an airplane banked too little, and rolls inwardly to the left while on a left hand turn banked too much. In other words the use of the banking element enables the pilot to properly maintain a laterally level attitude while flying straight and to bank at the proper angle when turning; and to do so the ball indicator should remain in the region of the central reference marks.

What we claim is:

1. A turn indicator comprising in combination, an instrument housing, instrument board installation means carried by the housing, an indicating dial carried in one end of the housing forward of the installation means, an air injecting nozzle located at the other end of the housing, an air evacuating valve located in the housing to the rear of the installation means, a reach rod connecting with the valve and extending forwardly alongside the housing, a manually operable end piece carried by the rod and movable across the dial by which an operator may regulate the air evacuating valve, a gyroscopic element having a notched rotor carried in the housing substantially in tangential alignment with the nozzle, indicating means operated by the gyroscopic element, a dashpot, a post carried by the gyroscope and reaching toward the dashpot, a lever having one end fixed to the post and the other end pivotally connected with the dashpot, centralizing means connected with the lever, and an adjustment device attached to the centralizing means.

2. A turn indicator comprising in combination, an instrument housing, instrument board installation means carried by the housing, an indicating dial carried in one end of the housing forward of the installation means, an air injecting nozzle located at the other end of the housing, an air evacuating valve located in the housing to the rear of the installation means, a reach rod connecting with the valve and extending forwardly alongside the housing, a manually operable end piece fixed to the rod and movable across the dial by which an operator may regulate the air evacuating valve, a gyroscopic element having a notched rotor carried in the housing substantially in tangential alignment with the nozzle, an indicating means operated by the gyroscopic element, a dashpot having a piston located at one end of the gyroscopic element, two reach posts rigidly carried by said gyroscopic element, means connecting one post with the dashpot piston and the other post with the aforesaid indicating means, and a centralizing device arranged to urge the gyroscope to normal position.

3. A turn indicator comprising in combination, an instrument housing, instrument board installation means carried on the housing, an indicating dial carried in one end of the housing forward of the installation means, an air injecting nozzle located at the other end of the housing, an air evacuating valve located in the housing to the rear of the installation means, a reach rod connecting with the valve and extending forwardly alongside the housing and having a manually operable end piece movable across the dial by which an operator may regulate the air evacuating valve, a gyroscopic element having a notched rotor carried in the housing substantially in tangential alignment with the nozzle, indicating means operated by the gyroscopic element, a dashpot cylinder fixed to the housing, a piston working in the cylinder, a link, a U-shaped lever having one end fixed to the gyroscopic element and the other end connected by means of said link to the piston adapting the lever to hook in and out of the cylinder during the precessional period of the gyroscopic element, and a centralizing means to return the gyroscopic element to normal position.

4. A turn indicator comprising in combination, a housing, a bridge made in the housing, a gyroscope frame pivotally carried at one end on the bridge and at the other end thereof on a wall of the housing, a rotor journaled in the frame, means for driving the rotor, a disc attached to the frame and disposed inside the bridge, a post carried on the upper part of the disc and reaching beyond the bridge, a dashpot carried on the bridge and cooperating with the post; a pin carried on the lower part of the disc and projecting beyond the bridge, transmitting means carried in the housing and connected with the pin, and indicating means actuated by the transmitting means.

5. A turn indicator comprising in combination, an instrument housing, a supporting bridge anchored therein, a gyroscope pivotally supported between the bridge and a wall of the housing, a frame carried by the gyroscope and reaching above and below the bridge, an indicator actuating device anchored to the frame and reaching beyond the bridge, a bumper stop carried by the indicator actuating device and adapted to stop against the bridge, an operating arm engaging the actuating device, and an indicator worked by the operating arm.

6. A turn indicator comprising in combination, an instrument housing, a supporting bridge anchored therein, a gyroscope pivotally supported between the bridge and a wall of the housing, a frame plate carried by the gyroscope and reaching above and below the bridge, an indicator actuating device anchored to the frame plate and reaching beyond the bridge, a bumper stop carried by the indicator actuating device and adapted to stop against the bridge, an operating arm engaging the actuating device, an indicator worked by the operating arm, a post anchored to the frame plate substantially opposite the indicator actuating device and projecting beyond the bridge, and a dashpot anchored to the bridge and cooperating with the post.

7. A turn indicator comprising in combination, an instrument housing, a supporting bridge anchored therein, a gyroscope pivotally supported between the bridge and a wall of the housing, a frame plate carried by the gyroscope and reaching above and below the bridge, an indicator actuating device anchored to the vertical frame plate and reaching beyond the bridge, a bumper stop carried by the indicator actuating device and adapted to stop against the bridge, an operating arm engaging the actuating device, an indicator worked by the operating arm, means for driving the gyroscope, means for regulating the driving means, a reach rod extending from the front end of the instrument housing to the regulating means, a centralizing spring cooperating with the gyroscope, and an adjustor on the front of the housing for varying the strength of the spring.

8. A turn indicator comprising in combination, a gyroscope, a dashpot cooperating therewith, a valve block anchored to the dashpot and having an air passage extending from the block to the dashpot, a plunger slidably confined in the valve block and acting to vary the size of the air passage, a spring acting on the plunger urging it toward the air passage, a manual regulating means cooperating with said spring to move the plunger back and forth over the air passage to vary the size of said passage, centralizing means connected with the gyroscope, and indicating means operated by the gyroscope.

9. A turn indicator comprising in combination, a housing, a bridge disposed therein, a gyroscope pivoted between the bridge and a wall of the housing, a frame extension carried by the gyroscope and reaching over the bridge, a dashpot carried on the bridge, an arched link serving to connect the dashpot with the frame extension, a centralizing spring having one end attached to the arched link, a movable anchorage device carried by the housing and serving as an anchorage means to hold the other end of the centralizing spring, a manual adjustment device to regulate the position of the movable anchorage device, means for driving the gyroscope, and dial indicating means operated by the gyroscope.

10. A turn indicator comprising in combination, a housing, a bridge disposed therein, a gyroscope pivoted between the bridge and a wall of the housing, a frame extension carried by the gyroscope and reaching over the bridge, a dashpot carried on the bridge, an arched link serving to connect the dashpot with the frame extension, a centralizing spring having one end attached to the arched link, a movable anchorage device carried by the housing and serving as an anchorage means to hold the other end of the centralizing spring, a manual adjustment device to regulate the position of the movable anchorage device, means for driving the gyroscope, dial indicating means operated by the gyroscope, a manual adjustment device located on the housing in the vicinity of the dial, an instrument board installation means carried on the housing, a reach rod extending from the manual adjustment device past the installation means, and a regulating means on the rear end of the reach rod for varying the speed of the gyroscope.

11. A turn indicator comprising in combination, a housing, a bridge carried therein, adjustment devices located externally of the housing and projecting inside thereof at each end of the bridge and near the front end of the housing, a spring mounted alongside the bridge and variable in strength by operation of one of said devices, a valve carried on the bridge and adjustable by operation of the other device, a dashpot carried on the bridge and cooperating with both the spring and valve, a gyroscope pivotally carried between the bridge and a wall of the housing, a single connecting member serving to place the said gyroscope under the combined influence of the spring and the dashpot, dial indicating means operated by the gyroscope, and means for driving the gyroscope.

12. A gyro instrument comprising a frame, a gyroscope mounted in said frame, an indicator actuated by said gyroscope, a cylinder and a piston therein; and a U-shaped link which straddles the cylinder and has one end normally inside the cylinder connected with the piston and the other end outside the cylinder connected with the frame.

13. A gyro instrument comprising a frame, a gyroscope carried in said frame and supported therein for precession, an indicator operated by said gyroscope, a reach post projecting from the frame and moved in a circle by the precession, a damping device, an arched link one end of which is rigidly anchored to the outer end of the reach post, and means pivotally connecting the other end of the link to the damping device.

14. A gyro instrument comprising a frame, a gyroscope mounted in said frame, an indicator worked by said gyroscope, damping means connected with the gyroscope, a valve provided with a passage leading to the damping device, a tapered plunger in the passage, a spring urging said plunger toward a position to close said passage, and means to regulate the position of the plunger including a screw bearing on one end of the plunger.

In testimony whereof we affix our signatures.

CHARLES H. COLVIN.
MORRIS M. TITTERINGTON.